United States Patent
Taig et al.

(10) Patent No.: US 8,711,449 B2
(45) Date of Patent: Apr. 29, 2014

(54) SYSTEMS AND METHOD FOR AUTOMATIC COLOR PLANE MISREGISTRATION CALIBRATION

(75) Inventors: Elad Taig, Lexington, MA (US); Shai Druckman, Givatayim (IL); Itsik Shaul, Bat-Yam (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 13/047,060

(22) Filed: Mar. 14, 2011

(65) Prior Publication Data

US 2012/0236331 A1 Sep. 20, 2012

(51) Int. Cl.
*H04N 1/46* (2006.01)

(52) U.S. Cl.
USPC .............................. 358/504; 358/515; 358/518

(58) Field of Classification Search
CPC ..... H04N 1/60; H04N 1/6033; H04N 1/6036; H04N 1/00002; H04N 1/00015; H04N 1/00023
See application file for complete search history.

(56) References Cited

U.S. PATENT DOCUMENTS

| | | | | |
|---|---|---|---|---|
| 4,853,738 A | * | 8/1989 | Rushing | 399/39 |
| 4,878,063 A | * | 10/1989 | Katerberg | 347/19 |
| 6,563,524 B1 | * | 5/2003 | Regimbal et al. | 347/116 |
| 6,895,862 B1 | | 5/2005 | Ben-Chorin et al. | |
| 7,035,559 B2 | * | 4/2006 | Tanaka et al. | 399/49 |
| 7,787,810 B2 | | 8/2010 | Kerxhalli et al. | |
| 8,204,416 B2 | * | 6/2012 | Calamita et al. | 399/301 |
| 8,270,049 B2 | * | 9/2012 | McElvain | 358/515 |
| 8,305,644 B2 | * | 11/2012 | Nakamura | 358/3.23 |
| 2003/0053103 A1 | * | 3/2003 | Patton | 358/1.13 |
| 2004/0131371 A1 | * | 7/2004 | Itagaki et al. | 399/49 |
| 2007/0263239 A1 | * | 11/2007 | Miyata | 358/1.9 |
| 2008/0079797 A1 | * | 4/2008 | Sagi et al. | 347/116 |
| 2008/0239400 A1 | * | 10/2008 | Yoshida | 358/3.01 |
| 2010/0245519 A1 | | 9/2010 | Johnston | |
| 2011/0123235 A1 | * | 5/2011 | Matsuzaki | 399/301 |
| 2011/0176187 A1 | * | 7/2011 | Goto | 358/498 |

FOREIGN PATENT DOCUMENTS

JP 2008076473 A 4/2008

* cited by examiner

*Primary Examiner* — Dung Tran

(57) ABSTRACT

A system and a method for implementing an automatic color plane misregistration (CPR) calibration procedure on a printing device are provided. The system includes a printing device. The printing device includes a user interface configured to receive a set of user inputs corresponding to parameters of a desired print project. The printing device also includes an automatic CPR calibration component configured to automatically implement a CPR calibration procedure in response to a user-defined trigger condition being met. The user-defined trigger condition can be programmable and stored in a memory.

12 Claims, 2 Drawing Sheets

SYSTEMS AND METHOD FOR AUTOMATIC COLOR PLANE MISREGISTRATION CALIBRATION

BACKGROUND

A color plane misregistration (CPR) problem can occur on a printing device when two or more color separations are misaligned with respect to each other. The misalignment that occurs can be detected in the vertical direction or the horizontal direction, and can be uniform across a given printed page or can be local on the page. Typical print projects can allow for a maximum within-specification limit of CPR on a printing device between any two colors in each direction, such as 100 μm. However, CPR can increase over time due to a variety of factors, such as substrate properties, blanket properties, temperature, humidity, ink accumulation, mechanical wear, and/or other factors. Thus, a printing device may be calibrated to substantially mitigate CPR.

DETAILED DESCRIPTION

Figure 1:
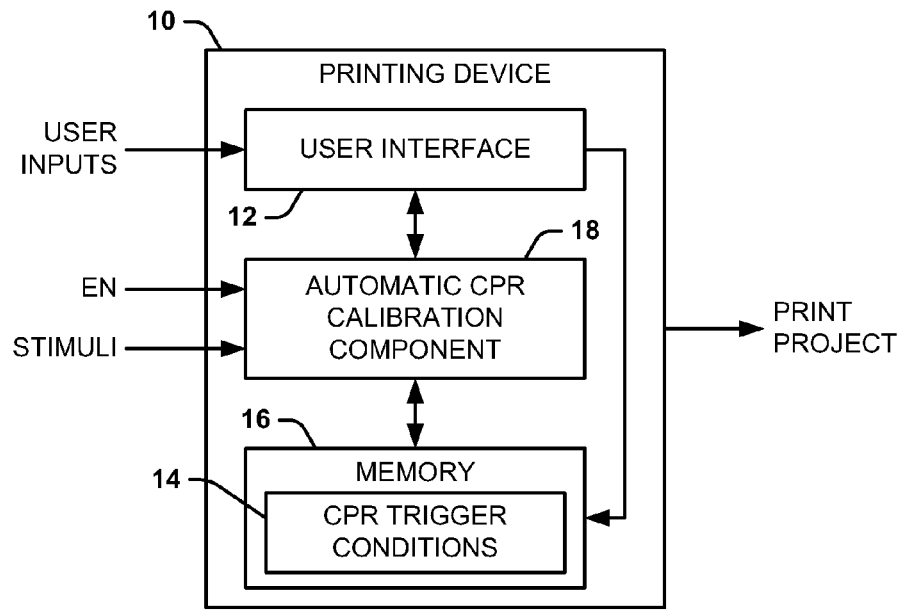
FIG. 1 illustrates an example of a printing device.

FIG. 1 illustrates an example of a printing device 10. The printing device 10 can be configured as any of a variety of printing devices. For example, the printing device 10 can be an industrial printing press that is configured to print on a variety of different substrate types, such as at a rate of thousands of pages per day. However, the printing device 10 could also be configured as a personal printer, such as configured as a peripheral device for a personal computer or as a network printer for a plurality of personal computers.

The printing device 10 includes a user interface 12 that is configured to receive user inputs. As an example, the user interface 12 could be a local interface that is configured on the printing device 10 itself. As another example, the user interface 12 could be a network interface to the printing device 10, such that the user inputs could be provided through a computing device (not shown), such as a personal computer, that is coupled to the printing device 10 via a network. The user inputs can include parameters associated with a desired print project, such as to identify a type of substrate on which information is to be printed for the print project, characteristics associated with the type of substrate, a number of pages to be printed in a given lot, and/or any of a variety of other parameters. As an example, the user interface 12 can be configured to allow a user to select from a list of a plurality of predetermined sets of parameters that each correspond to different print projects.

The user inputs can also include one or more user-defined color plane misregistration (CPR) trigger conditions 14 that each define a separate condition for implementing a CPR calibration procedure, as described herein. In the example of FIG. 1, the user-defined CPR trigger conditions 14 are saved in a memory 16. As an example, the memory 16 can likewise store additional information associated with the printing device 10, such as the sets of parameters corresponding to each of the desired print projects that can be implemented on the printing device 10.

During a given print project and/or over time, a number of factors can contribute to CPR on the printing device 10, such that two or more of the color separations in the CMYK color model are misaligned with respect to each other. For example, CPR can increase over time due to factors such as substrate properties, blanket properties, temperature, humidity, ink accumulation, and/or mechanical wear. In order to substantially mitigate CPR, such as to a level that is within a given predetermined specification (e.g., less than 100 μm), a CPR calibration can be typically performed. As an example, a CPR calibration can typically be performed by based on a predetermined schedule, such as once a day, by a user while the printing device 10 is offline, either before or after implementing a given print project. The CPR calibration can be implemented based on manually activating a calibration routine, such as a CPR wizard, during which the printing device 10 generates printed pages for the calibration of the printing device 10, such as to reduce the CPR to within a specification (e.g., between 60 μm and 80 μm). Thus, upon implementing the manual CPR calibration procedure, the printing device 10 can begin a print project.

In addition to the manual CPR calibration technique described above, the printing device 10 is configured to implement an automatic CPR calibration procedure, as described herein. Specifically, the printing device 10 includes an automatic CPR calibration component 18. The automatic CPR calibration component 18 is configured to implement automatic CPR calibration procedures for the printing device 10 in response to one or more of the CPR trigger conditions 14 being met. In the example of FIG. 1, the automatic CPR calibration component 18 can be enabled by a user via a signal EN, such as provided to the user interface 12. As an example, the automatic CPR calibration component 18 can be implemented as hardware, as software, or as a combination of hardware and software.

As an example, the CPR trigger conditions 14 can be associated with a user-defined number of pages of a given print project or of a total number of printed pages. Thus, upon the printing device 10 printing the user-defined number of pages, the automatic CPR calibration component 18 can automatically activate the CPR calibration procedure. As another example, the CPR trigger conditions 14 can be associated with a user-defined duration of time. Therefore, upon the user-defined duration of time expiring, the automatic CPR calibration component 18 can automatically activate the CPR calibration procedure. The duration of time can be real-time, or can be associated only with an accumulation of time during which one or more print projects are being performed. As yet another example, the CPR trigger conditions 14 can be associated with both time and a number of pages, such that the automatic CPR calibration component 18 can automatically activate the CPR calibration procedure in response to either of the CPR trigger conditions 14 being met, with the accumulated total of the other condition being reset upon implementation of the automatic CPR calibration procedure.

As yet a further example, the CPR trigger conditions 14 can be associated with a measured amount of CPR. For example, the printing device 10 could include one or more sensor components (not shown) configured to dynamically measure CPR associated with the print project and to compare the measured CPR with a threshold (e.g., approximately 80 μm). The threshold could be programmable by a user, such that the threshold could be provided as a user input to the user interface 12. Thus, the automatic CPR calibration component 18 can be configured to automatically implement the CPR calibration procedure upon the measured CPR substantially exceeding the threshold, such as defined in the CPR trigger conditions 14. Furthermore, the automatic CPR calibration component 18 can be configured to continue implementation of the automatic CPR calibration procedure until the associated sensor components measure an acceptable amount of CPR (e.g., less than 80 μm) on the CPR calibration pages. It is to be understood that the automatic CPR calibration component 18 can be configured to implement the automatic CPR calibration procedure based on both the measured CPR and a variety of other trigger conditions of the CPR trigger conditions 18.

The automatic CPR calibration component 18 can be configured to implement the automatic CPR calibration procedure substantially instantaneously upon the one or more CPR trigger conditions 14 being met. As an example, the automatic CPR calibration component 18 can be configured to interrupt a given print project to implement the automatic CPR calibration procedure. For example, upon a CPR trigger condition 14 being met while the printing device 10 is performing a print project, the automatic CPR calibration component 18 can be configured to command the printing device 10 to pause the currently processing print project. The automatic CPR calibration component 18 can then implement the automatic CPR calibration procedure while the currently processing print project is paused. Upon completion of the automatic CPR calibration procedure, the automatic CPR calibration component 18 can command the printing device 10 to resume the currently processing print project.

As another example, the automatic CPR calibration component 18 can be configured to implement the automatic CPR calibration procedure as a substantially abbreviated version of a CPR calibration procedure. For example, the abbreviated form of the CPR calibration procedure can be implemented to calibrate a subset of the separations of the CMYK model colors, instead of each separation of the CMYK model colors. For instance, a user can specify which and/or how many of the separations of the CMYK model colors can be calibrated (e.g., just the first, the second, the third, or the fourth separation, or any combination therein). In addition, the automatic CPR calibration component 18 can be configured to implement simplex or duplex calibration (i.e., simplex or duplex sides of the print project), such as in response to the user inputs provided to the user interface 12.

Figure 2:
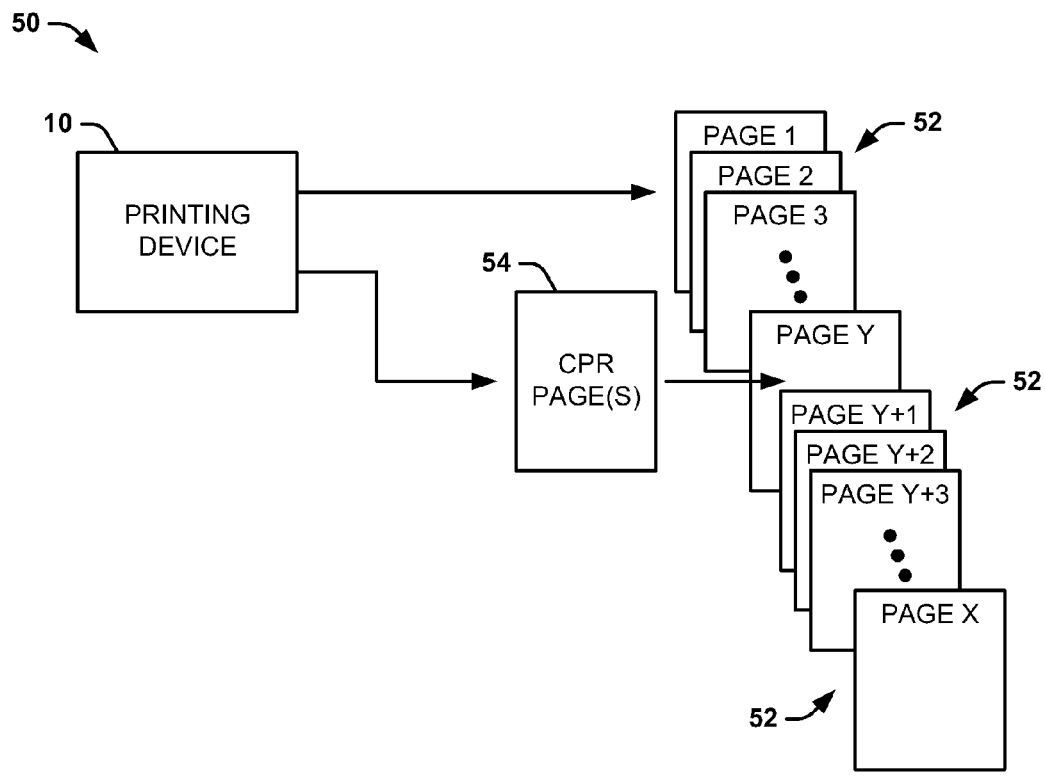
FIG. 2 illustrates an example of a print project with an automatic color plan plane misregistration (CPR) calibration performed therein.

FIG. 2 illustrates an example of a print project 50 with an automatic CPR calibration performed therein. The print project 50 can be performed by the printing device 10 in the example of FIG. 1. Therefore, reference is to be made to the example of FIG. 1 in the following description of the example of FIG. 2.

In the example of FIG. 2, the printing device 10 is demonstrated as in the process of performing a print project that involves printing a plurality X of pages 52, where X is a positive integer. As an example, X could have a value of greater than 1000. Subsequent to beginning the print project 50, the printing device 10 can meet one of the CPR trigger conditions 14 that have been programmed in the printing device 10 by a user and stored in the memory 16. As an example, the CPR trigger condition 14 could be one or both of elapsed time and a number of printed pages 52. In the example of FIG. 2, the CPR trigger condition 14 is demonstrated as having been met just subsequent to the printing of the $Y^{th}$ page 52, where Y is less than X.

In response to having met the CPR trigger condition 14, the printing device 10 can be commanded by the automatic CPR calibration component 18 to pause the print project 50. Thus, subsequent to printing the $Y^{th}$ page 52, the automatic CPR calibration component 18 can command the printing device 10 to automatically perform a CPR calibration procedure. Thus, the printing device 10 automatically implements the CPR calibration procedure during the currently processing print project. In the example of FIG. 2, the automatic CPR calibration procedure is demonstrated as the printing device 10 printing one or more CPR calibration pages 54, such as required during a typical CPR calibration procedure. The printing device 10 can thus implement the steps necessary for a CPR calibration procedure, such as the implementation of a CPR calibration wizard that may be manually performed by a user. As an example, depending on the preferences of the CPR calibration procedure, the printing device 10 can print the one or more CPR calibration pages 54 to a different output than the pages 52, such that the CPR calibration pages 54 become separated from the pages 52 of the print project 50.

Upon completion of the automatic CPR calibration procedure, the printing device 10 can resume the print project 50. Thus, in the example of FIG. 2, after outputting the one or more CPR calibration pages 54, the printing device 10 prints the page Y+1 and subsequent pages of the print project 50, until the $X^{th}$ page is printed to conclude the print project 50. Accordingly, the automatic CPR calibration component 50 can allow the printing device 10 to be CPR calibrated to substantially mitigate CPR of the printing device 10, even during very long print projects. As a result, the automatic CPR calibration component 18 can substantially mitigate waste from print projects that are out of specification or become out of specification during the print project. In addition, by performing automatic CPR calibration procedures and by mitigating the potential for wasted print projects, the automatic CPR calibration component 18 likewise saves time, thus allowing for greater output of print projects than by just implementing manual CPR calibrations alone.

The user-defined CPR trigger conditions 14 can be programmed with varying levels of complexity. As an example, the CPR trigger conditions 14 can be programmed to include a set number of automatic CPR calibrations for a given print project, with each of the automatic CPR calibrations being based on a specific amount of elapsed time or number of pages. As an example, the CPR trigger conditions 14 can be programmed, for a specific print project having predefined parameters, to perform a first automatic CPR calibration procedure after the printing device 10 has printed 500 pages, a second automatic CPR calibration procedure after the printing device 10 has printed 2000 pages, and a third automatic CPR calibration procedure after the printing device 10 has printed 5000 pages. As another example, the CPR trigger conditions 14 can include a number of Boolean operators, such that multiple CPR trigger conditions 14 are required to be met or met in a certain order before an automatic CPR calibration procedure is to be performed.

Furthermore, the user-defined CPR trigger conditions 14 can also include a variety of other conditions. For example, the printing device 10 could include a sensor (not shown) that monitors CPR of the print project, such that the automatic CPR calibration component 18 commands the printing device 10 to implement the automatic CPR calibration procedure upon the CPR of the printing device 10 exceeding specification. As another example, the printing device 10 could include a manner of performing a manual activation of an automatic CPR calibration procedure, such that a user can press a button, such as at the user interface 12, to automatically perform a CPR calibration procedure. Thus, the user can initiate a CPR calibration procedure whenever desired, including during processing of a print project, similar to as demonstrated in the example of FIG. 2.

The CPR trigger conditions 14 can also be programmed based on specific parameters of certain print projects. As an example, the programming of the CPR trigger conditions 14 by a user can be based on parameters such as substrate types, substrate thickness, whether the substrate is coated or not, whether the substrate is a long grain or short grain paper type, or any of a variety of other parameters of the print project. As one example, the programming of the CPR trigger conditions 14 can correspond to each of a plurality of saved desired print projects, such as stored in the memory 16. Thus, the user can select a given print project from the user interface 12, such that the automatic CPR calibration component 18 can receive the selected print project from the user interface 12 and can load the appropriate corresponding CPR trigger conditions 14 from the memory 16. As another example, the automatic CPR calibration component 18 can be configured to intelligently modify the CPR trigger conditions 14 based on the parameters of desired print project. Thus, upon the user selecting the desired print project or entering the parameters of a desired print project, the automatic CPR calibration component 18 can receive the parameters of the desired print project from the user interface 12 or the memory 16 and can modify a set of pre-existing CPR trigger conditions 14 based on the parameters of the print project. Accordingly, the CPR trigger conditions 14 can be based on the parameters of the print projects implemented by the printing device 10.

As described above, implementation of the automatic CPR calibration procedures can save time relative to performing typical manual CPR calibration procedures alone. Due to the requirement for time savings, particularly with respect to performing the automatic CPR calibration procedures during a currently processing print project, the automatic CPR calibration procedure can be implemented as an abbreviated form of a typical manual CPR calibration procedure, such as performed by a CPR calibration wizard. As an example, the abbreviated form of the automatic CPR calibration procedure can include only a single calibration step, such as on a first separation of the CMYK model colors, instead of on each separation of the CMYK model colors. Thus, users can still perform routinely scheduled manual CPR calibrations, but can also perform the abbreviated automatic CPR calibration procedures based on the CPR trigger conditions 14 to substantially mitigate CPR in the printing device 10 and to save time during processing of print projects. Furthermore, the automatic CPR calibration component 18 can also be disabled via the signal EN, such that more time can be saved, such as when CPR specification requirements are not required.

Figure 3:
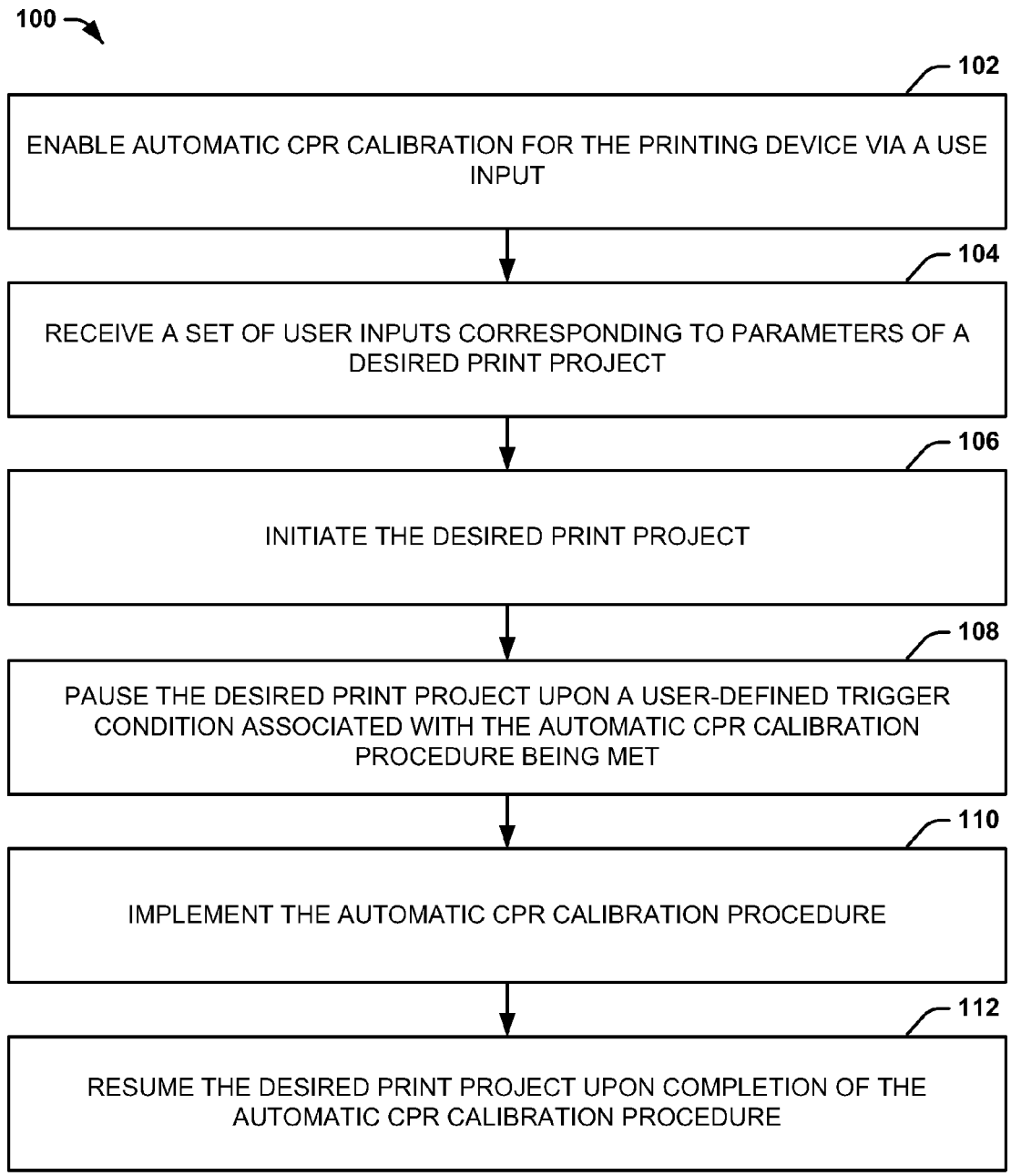
FIG. 3 illustrates an example of a method for implementing an automatic CPR calibration procedure on a printing device.

In view of the foregoing structural and functional features described above, an example method will be better appreciated with reference to FIG. 3. While, for purposes of simplicity of explanation, the method of FIG. 3 is shown and described as executing serially, it is to be understood and appreciated that the method is not limited by the illustrated order, as parts of the method could occur in different orders and/or concurrently from that shown and described herein.

FIG. 3 illustrates an example of a method 100 for implementing an automatic CPR calibration procedure on a printing device. At 102, automatic CPR calibration is enabled for the printing device via a user input. At 104, a set of user inputs corresponding to parameters of a desired print project are received (e.g., via the user interface 12). At 106, the desired print project is initiated. At 108, the desired print project is paused upon a user-defined trigger condition associated with the automatic CPR calibration procedure being met (e.g., based on the CPR trigger conditions 14). At 110, the automatic CPR calibration procedure is implemented (e.g., via a command from the automatic CPR calibration component 18). At 112, resuming the desired print project is resumed upon completion of the automatic CPR calibration procedure.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. A printing device comprising:
   a user interface configured to receive a set of user inputs corresponding to parameters of a desired print project; and
   an automatic color plane misregistration (CPR) calibration component configured to automatically implement a CPR calibration procedure in response to a user-defined trigger condition being met during the desired print project, the automatic CPR calibration procedure being programmed to be an abbreviated version of a manual CPR calibration procedure, the automatic CPR calibration procedure comprising calibration of less than all separations of the CMYK color model and CPR calibration of one of simplex and duplex sides of the pages of the printing device, the user-defined trigger condition being programmable and stored in a memory.

2. The printing device of claim 1, wherein the user-defined trigger condition comprises at least one of passage of a predetermined amount of time, the printing of a predetermined number of pages, and a measured amount of CPR of the printing device substantially exceeding a programmable threshold.

3. The printing device of claim 1, wherein the user-defined trigger condition comprises a plurality of user-defined trigger conditions that each define a separate condition for implementing the CPR calibration procedure.

4. The printing device of claim 3, wherein at least a portion of the plurality of user-defined trigger conditions correspond to each of a respective plurality of sets of parameters of desired predefined print projects.

5. The printing device of claim 1, wherein the automatic CPR calibration component is configured, upon the user-defined trigger condition being met, to pause a currently processing print project to implement the automatic CPR calibration procedure and to resume the currently processing print project upon completion of the automatic CPR calibration procedure.

6. The printing device of claim 1, wherein the automatic CPR calibration component is configured to be enabled and disabled in response to a user input.

7. A method for implementing an automatic color plane misregistration (CPR) calibration procedure on a printing device, the method comprising:
   enabling automatic CPR calibration for the printing device via a user input;
   receiving a set of user inputs corresponding to parameters of a desired print project;
   initiating the desired print project;
   pausing the desired print project upon a user-defined trigger condition associated with the automatic CPR calibration procedure being met;

implementing the automatic CPR calibration procedure, the automatic CPR calibration procedure being an abbreviated CPR calibration procedure with respect to a manual CPR calibration procedure, the automatic CPR calibration procedure comprising calibration of less than all separations of the CMYK color model and CPR calibration of one of simplex and duplex sides of the pages of the printing device; and resuming the desired print project upon completion of the automatic CPR calibration procedure.

8. The method of claim 7, further comprising:
receiving the user-defined trigger condition via a user interface; and
storing the user-defined trigger condition in a memory.

9. The method of claim 8, wherein receiving the user-defined trigger condition comprises receiving a plurality of user-defined trigger conditions that each define a separate condition for implementing the CPR calibration procedure, wherein at least a portion of the plurality of user-defined trigger conditions correspond to each of a respective plurality of sets of parameters of desired print projects.

10. A printing device comprising:
a user interface configured to receive a set of user inputs corresponding to parameters of a desired print project and to a plurality of trigger conditions associated with an automatic color plane misregistration (CPR) calibration procedure, each of the plurality of trigger conditions defining a separate condition for implementing the CPR calibration procedure, at least a portion of the plurality of trigger conditions being specific to the parameters of the desired print project;

a memory configured to store the plurality of trigger conditions; and an automatic CPR calibration component configured to automatically implement an abbreviated version of a CPR calibration procedure in response to one of the plurality of trigger conditions being met, the abbreviated version of the manual CPR calibration comprises calibration of less than all separations of the CMYK color model and CPR calibration of one of simplex and duplex sides of the pages of the printing device.

11. The printing device of claim 10, wherein each of the plurality of trigger conditions comprises at least one of passage of a predetermined amount of time, the printing of a predetermined number of pages based on the parameters of the desired print project, and a measured amount of CPR of the printing device substantially exceeding a programmable threshold.

12. The printing device of claim 10, wherein the automatic CPR calibration component is configured, upon one of the plurality of trigger conditions being met, to pause a currently processing print project to implement the CPR calibration procedure and to resume the currently processing print project upon completion of the CPR calibration procedure.

* * * * *

UNITED STATES PATENT AND TRADEMARK OFFICE
CERTIFICATE OF CORRECTION

PATENT NO. : 8,711,449 B2
APPLICATION NO. : 13/047060
DATED : April 29, 2014
INVENTOR(S) : Elad Taig et al.

Page 1 of 1

It is certified that error appears in the above-identified patent and that said Letters Patent is hereby corrected as shown below:

In The Specification

In column 1, line 25, before "plane" delete "plan".

Signed and Sealed this
Seventh Day of June, 2016

Michelle K. Lee
*Director of the United States Patent and Trademark Office*